(12) United States Patent
Magaldi

(10) Patent No.: US 12,738,878 B2
(45) Date of Patent: Sep. 15, 2026

(54) DEVICE, PLANT AND METHOD FOR THE STORAGE AND TRANSFER OF THERMAL ENERGY OF SOLAR ORIGIN

(71) Applicant: MAGALDI POWER S.P.A., Rome (IT)

(72) Inventor: Mario Magaldi, Salerno (IT)

(73) Assignee: MAGALDI POWER S.P.A., Rome (IT)

( * ) Notice: Subject to any disclaimer, the term of this patent is extended or adjusted under 35 U.S.C. 154(b) by 608 days.

(21) Appl. No.: 17/266,267

(22) PCT Filed: Jul. 23, 2019

(86) PCT No.: PCT/IB2019/056272
§ 371 (c)(1),
(2) Date: Feb. 5, 2021

(87) PCT Pub. No.: WO2020/031007
PCT Pub. Date: Feb. 13, 2020

(65) Prior Publication Data

US 2022/0115977 A1 Apr. 14, 2022

(30) Foreign Application Priority Data

Aug. 9, 2018 (IT) ........................ 102018000007998

(51) Int. Cl.
*H02S 10/30* (2014.01)
*F24S 20/20* (2018.01)
(Continued)

(52) U.S. Cl.
CPC .............. *H02S 10/30* (2014.12); *F24S 20/20* (2018.05); *F24S 60/00* (2018.05); *F28D 13/00* (2013.01); *F28D 1/04* (2013.01)

(58) Field of Classification Search
CPC ........... H02S 10/30; F24S 20/20; F24S 60/00; F28D 13/00; F28D 1/04
See application file for complete search history.

(56) References Cited

U.S. PATENT DOCUMENTS 3,331,707 A 7/1967 Werth
3,751,303 A 8/1973 Kittl
(Continued)

FOREIGN PATENT DOCUMENTS

KR 1020130054064 A * 2/2013 ............ F21S 11/002
WO 2013150347 A1 10/2013
WO WO-2017021832 A1 * 2/2017 ............... F03G 6/06

OTHER PUBLICATIONS

Park, KR1020130054064A, Machine Translation (Year: 2013).*
(Continued)

*Primary Examiner* — Devina Pillay
(74) *Attorney, Agent, or Firm* — LUCAS & MERCANTI, LLP

(57) ABSTRACT

The object of the present invention is to use the high temperature thermal power stored in the fluid bed in conjunction with thermophotovoltaic (TPV) technology. TPV technology requires thermal emitters at high temperature (>600° C.) to produce electricity from thermal radiation. TPV thermal emitters are located immersed in or exposed to a hot particles fluidized bed, protected by suitable layers of high temperature resistant material, like ceramic or refractory walls. Such high temperature fluidized bed, will provide thermal power to the TPV cells, to produce electricity.

14 Claims, 3 Drawing Sheets

(51) Int. Cl.

| | |
|---|---|
| ***F24S 60/00*** | (2018.01) |
| ***F28D 1/04*** | (2006.01) |
| ***F28D 13/00*** | (2006.01) |

(56) References Cited

U.S. PATENT DOCUMENTS

| | | | | |
|---|---|---|---|---|
| 4,316,048 | A | 2/1982 | Woodall | |
| 4,836,862 | A | 6/1989 | Pelka et al. | |
| 6,337,437 | B1 * | 1/2002 | Fraas | H01L 31/02167 136/259 |
| 2003/0026536 | A1 * | 2/2003 | Ho | G02B 6/4298 385/35 |
| 2004/0035457 | A1 * | 2/2004 | Kribus | F24S 20/20 136/205 |
| 2013/0019598 | A1 * | 1/2013 | Tamaura | H10N 10/13 60/670 |
| 2013/0042857 | A1 * | 2/2013 | Magaldi | F24S 60/00 126/714 |
| 2016/0146507 | A1 * | 5/2016 | Johnson | F24S 50/20 126/714 |
| 2016/0164507 | A1 * | 6/2016 | Vahid Far | H03K 5/1565 327/116 |
| 2018/0230973 | A1 * | 8/2018 | Magaldi | F03G 6/064 |

OTHER PUBLICATIONS

International Search Report and Written Opinion for Corresponding International Application No. PCT/IB2019/056272 (12 Pages) (Nov. 4, 2019).

* cited by examiner

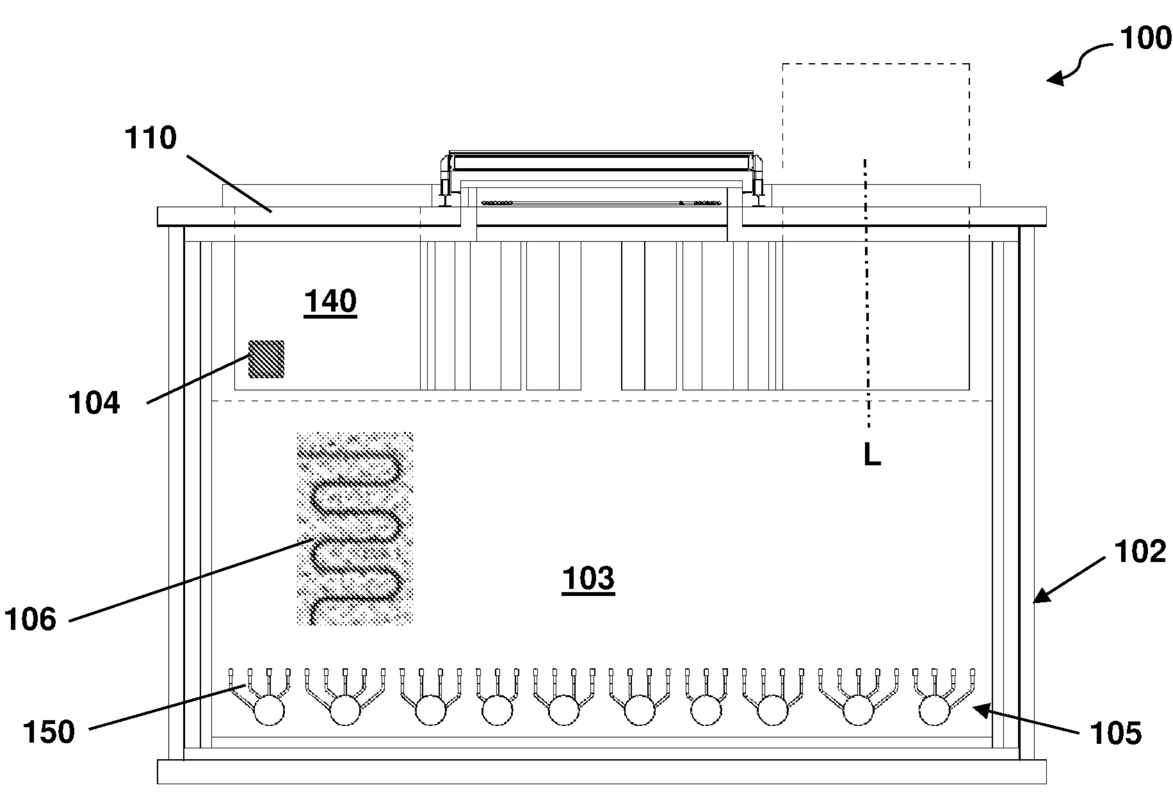
FIG. 1
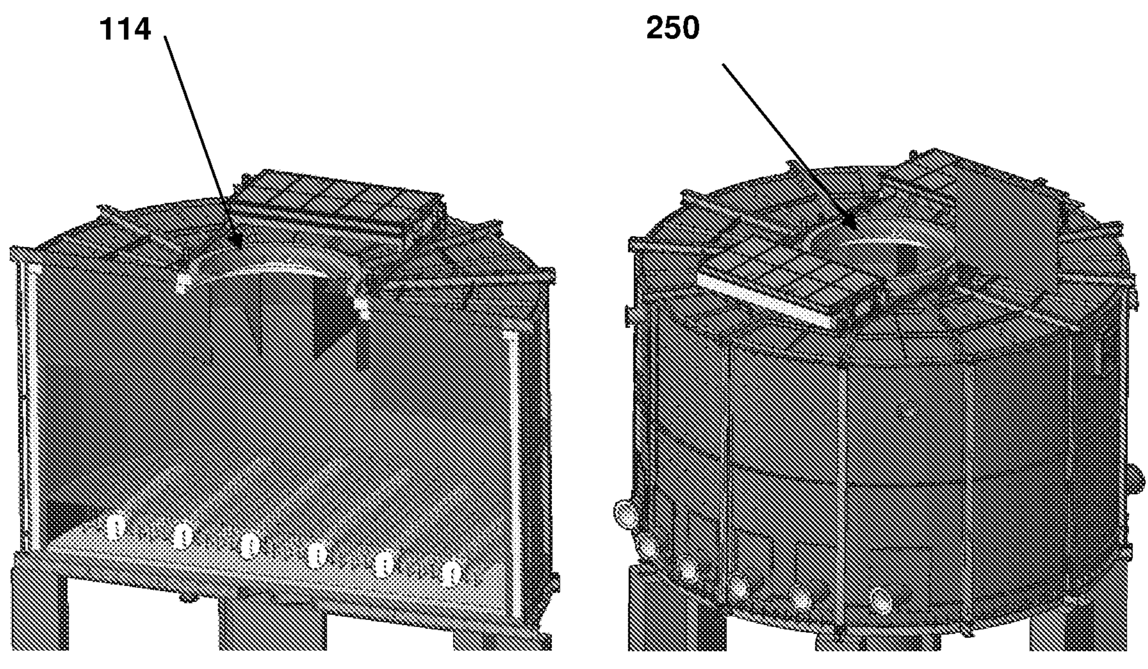
FIG. 2A
FIG. 2B

DEVICE, PLANT AND METHOD FOR THE STORAGE AND TRANSFER OF THERMAL ENERGY OF SOLAR ORIGIN

CROSS-REFERENCE TO RELATED APPLICATIONS

This application is a 371 of PCT/IB2019/056272, filed Jul. 23, 2019, which claims the benefit of Italian Patent Application No. 102018000007998, filed Aug. 9, 2018.

FIELD OF THE INVENTION

The present invention relates to a device, to a plant and to a method for the production of electric energy based upon exploitation of thermal energy of solar origin.

BACKGROUND OF THE INVENTION

The use of the thermal potential of solar energy, possibly concentrated by heliostats, for the production of electric energy is known in the art. In particular, devices for the storage and transfer of said thermal energy based upon a bed of fluidizable solid particles exposed, directly or indirectly, to solar radiation are disclosed, e.g., in WO2013/150347A1 and WO2017/021832A1 to the same Applicant. These known configurations generally include heat exchangers, e.g. tube bundles, crossed by a working fluid and immersed in the bed of particles, so that steam to activate a turbine can be generated.

The above technology based upon a fluidizable bed of particles achieves a unique capacity of absorbing intensive and variable solar power fluxes and with intrinsic safety. At the same time, said solutions attain high thermal diffusivity in the storage medium, i.e. the fluidized particles, with operating temperatures higher than those presently achievable by other so-called "Concentrated Solar Power" (CSP) technologies.

Still, there is space for improving the efficiency and performance of said systems, particularly in conjunction with the total cost of electric energy production, also in view of the so-called "grid parity".

SUMMARY OF THE INVENTION

The technical problem underlying the present invention is therefore to overcome the drawbacks mentioned above with reference to the known art by providing a device for the exploitation of thermal energy of solar origin to produce electric energy.

The above-mentioned problem is solved by a device according to claim 1 and a method according to claim 14.

Preferred features of the invention are the object of the dependent claims.

The invention provides a device for storage and transfer of thermal energy of solar origin based upon a solid storage means consisting of a bed of solid, fluidizable particles. Said bed of particles is thermally coupled to thermophotovoltaic (TPV) cells which produce electric energy.

The device of the invention allows high production efficiencies, low costs of investment and maintenance and high operational safety. In particular, the device has constructive simplicity, and, according to a preferred configuration, can be positioned on the ground, providing solar irradiation from above. In this latter configuration, irradiation from above can be carried out by reflective optical systems, for instance according to a so-called "beam down" configuration, or by mere positioning a mirror, or an equivalent means, at an altitude, e.g. on natural slopes or on dedicated elevated structures.

In addition, as said above the present invention employs the high temperature thermal power stored in the fluidizable bed in combination with thermophotovoltaic (TPV) technology, in particular TPV cells, to produce electricity from thermal radiation. In this way, the fluidized bed device collects and stores solar power as sensible heat of the bed solid particles. Such sensible heat, in turn, is converted directly into electricity, thanks to the TPV technology, for virtually round the clock power generation.

Preferably, the TPV means are exposed to thermal emitters, i.e. the fluidized bed particles, at high temperature, in particular ≥600° C. and most preferably in a range of about 700-1000° C.

The specific positioning and configuration of the TPV means within the fluidized bed device can be embodied in different ways. According to a first preferred configuration, the TPV cells are located immersed in the bed of hot particles, preferably protected by suitable layers, or shields, of high-temperature-resistant material, like ceramic or refractory walls.

According to a different preferred embodiment, the TPV means are embedded in the wall(s) of a casing housing the particle bed or at a lining layer thereof. In this latter configuration, thermal energy is conveyed to the TPV means by thermal conduction through the casing wall(s) and/or by radiation and/or convection.

According to a still another preferred configuration, the TPV means can be housed at a freeboard above the particle bed, eventually within a ceiling of the casing hosting such particle bed.

Compared to the already known technologies based upon storage and transfer of thermal energy of solar origin, the system of the invention is simpler, less expensive and more efficient. In particular, a system for steam generation is no more necessary in order to produce electricity. Accordingly, no heat exchangers immersed in the fluidized bed, steam pipe circuits interconnecting different modules together or steam turbines and associated equipment are necessary, with significant system simplification.

The above simplification allows building a modular system made of several accumulation and production devices, each based upon one or more fluidized bed of particles and respective TPV means associated therewith.

In addition, combination systems are also possible, wherein known heat exchangers based upon a working fluid are associated with the fluidized bed, in particular immersed therein, and exploited jointly with the TPV means.

In all the configurations mentioned above, additional TPV means can be arranged outside the solar receiver, for example on a secondary reflector of a beam-down system or at a preheater of the fluidization fluid or around the casing aperture.

Moreover, in any of the above configurations, additional power can be produced, during daytime, by a dedicated conventional photovoltaic system directly exposed to the solar radiation.

In all the above configurations, the energy for the auxiliary components of the system, in particular for the fluidized bed, can be produced, during daytime, by the TPV means.

The aforementioned polygenerative-type configuration, i.e. a configuration providing possible production of electric energy by associating the device to a turbine as well as by TPV means, allows maximizing efficiency.

In preferred arrangements, TPV means are used for producing electricity and heat exchangers (e.g. based upon tube bundles crossed by a processing fluid) for producing thermal power.

The device of the invention can be used both as module of a plant of any size and for so-called "stand-alone" applications, e.g. for desalination operations or to the service of small heat consumptions, to which it can confer high efficiency.

Other advantages, features and the operation steps of the present invention will be made apparent in the following detailed description of some embodiments thereof, given by way of example and not for limitative purposes.

BRIEF DESCRIPTION OF THE FIGURES

Reference Will be Made to the Figures of the Annexed Drawings, Wherein:

FIG. 1 shows a schematic representation, in longitudinal cross-section, of a first embodiment of a device for the storage and transfer of thermal energy of solar origin according to the invention, wherein TPV cells are arranged onto a device freeboard ceiling, in particular according to a vertical orientation and radial arrangement;

FIGS. 2A and 2B show a schematic representation, according to a perspective view partially in longitudinal cross-section and a full perspective view, respectively, of the device of FIG. 1;

DETAILED DESCRIPTION OF PREFERRED EMBODIMENTS OF THE INVENTION

Figure 3:
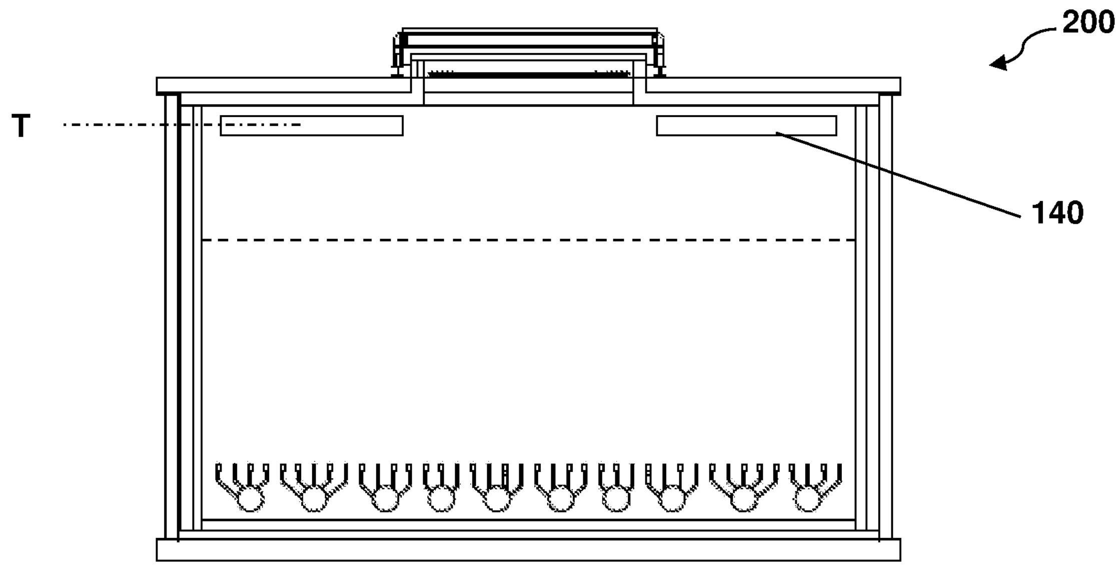
FIG. 3 shows a schematic representation, in longitudinal cross-section, of a variant embodiment of a device for the storage and transfer of thermal energy of solar origin according to the invention, wherein TPV cells are arranged onto a device freeboard ceiling, in particular according to a horizontal orientation.

Referring initially to FIGS. 1, 2A and 2B, a device according to a first preferred embodiment of the invention is globally denoted by 100. Device 100 is configured for storage and transfer of thermal energy associated with an incident solar radiation.

Device 100 comprises mainly a containment casing 102 and a bed of fluidizable solid particles, denoted by 103 and received inside casing 102.

In the present example, casing 102 has a substantially cylindrical geometry.

The containment casing 102 is thermally insulated so as to reduce to a minimum the dispersion of heat into the external environment, and is preferably made of metal.

Casing 102 may be totally closed with respect to the outside, in which case solar thermal energy is transmitted to bed of particles 103 by conduction through the casings walls. In an alternative configuration shown in the Figures, casing 102 may provide for one or more openings 250 allowing direct penetration of the solar radiation at its inside, so that the solid particles are irradiated directly from said radiation, without any shielding means interposed therebetween.

Device 100 also includes fluidization means 105 configured for inputting a fluidization gas, preferably air, into said bed 103 of fluidizable solid particles.

The fluidization gas is fed within the casing 102 to the bed 103 by feeding inlets 150 of air box type, known per se and schematically represented in the figures.

Preferably, at such inlets 150 it is provided a distribution means of the fluidization gas, apt to enable a uniform entry of the fluid and concomitantly ensure a support for the bed 103, contributing to realize the bottom of casing 102.

Bed of particles 103 is configured to be selectively moved by said fluidization gas for storing thermal energy received from the solar radiation. The fluidization of the bed of particles 103 ensures an effective and uniform heat exchange.

In variant embodiments, bed 103 can include several portions, eventually fluidizable one independently from the other.

Preferably, means for selectively varying the fluidization gas speed and/or flow rate are also provided. In this way, adjusting the extent of heat exchange and transfer is possible. In particular, by changing the speed of the fluidization gas across the particle bed 103 it is possible to control and modify the overall thermal exchange coefficient between the fluidized bed and the exchange surface, with consequent flexibility in the adjustment of the amount of thermal power transferred.

The choice of material for the particles of bed 103 privileges poor aptitude for abrasion and fragmentation, in response to the need to minimize the phenomenon of bed particles elutriation so as to limit the production and transportation of fines in the fluidization air, particularly for those configurations providing for an "open" casing 102. Based on these considerations, a preferred configuration favors the use, for bed particles, of granular material inert to oxidation, like, e.g., silicon carbide or quartz. Preferably, the particles have a regular shape, preferably spherical. Preferably, the particles have a size of the order of 50 to 500 microns (greater dimension or diameter), and such that said size is preferably native, that is not resulting from the aggregation of smaller particles.

According to the invention, device 100 comprises a plurality of thermophotovoltaic (TPV) cells, each denoted by 104 and configured to transform thermal energy of said fluidizable solid particles into electric energy.

In the present embodiment, said TPV cells are arranged at a freeboard ceiling 110 of casing 102. In particular, TPV cells 104 are arranged in groups, each group being mounted upon a common support 140. In this way, thermophotovoltaic modules are obtained, each formed by a support 140 and by the associated TPV cells 104. In the example considered, each support 140 is fixed at a terminal portion thereof at ceiling 110 and projects inside casing 102. In this configuration, the TPV cells may be in contact with, or lapped by, the particles of bed 103.

Preferably, each support 140 extends according to a main development direction, in particular a longitudinal direction L in the present example, which, still according to the embodiment represented, is a substantially vertical direction.

As mentioned above, the overall configuration is such that thermal energy is transferred from the solar radiation to the particles of bed 103 and from said fluidizable solid particles to the TPV cells 104. In alternative configurations, solar radiation can also impinge directly upon the TPV cells or a subgroup thereof.

Device 100 may also include heat exchanging means 106, preferably one or more pipe bundles, crossed, in use, by a working fluid, and arranged within said casing 102 so as to be immersed in, or lapped by, said bed 103 of fluidizable solid particles.

Typically, the pipe bundles 106 are part of a heat exchanging circuit suitable for producing steam to be expanded in a turbine or for other thermal industrial uses, such as desalination. In particular, as said above, the working fluid is preferably water in a liquid state which receives thermal energy to become superheated steam. Said superheated steam, in pre-determined and selected conditions of temperature and pressure, may be then utilized to produce electric energy by expanding in the turbine associated with an electric energy generator.

Device 100 may also comprise additional TPV cells or modules 114 directly exposed to solar radiation.

Such additional TPV cells or modules 114 can be arranged outside casing 102, where high temperature areas are present, like around the casing aperture or on a reflector of solar radiation and/or at a fluidization gas preheater.

Figure 4:
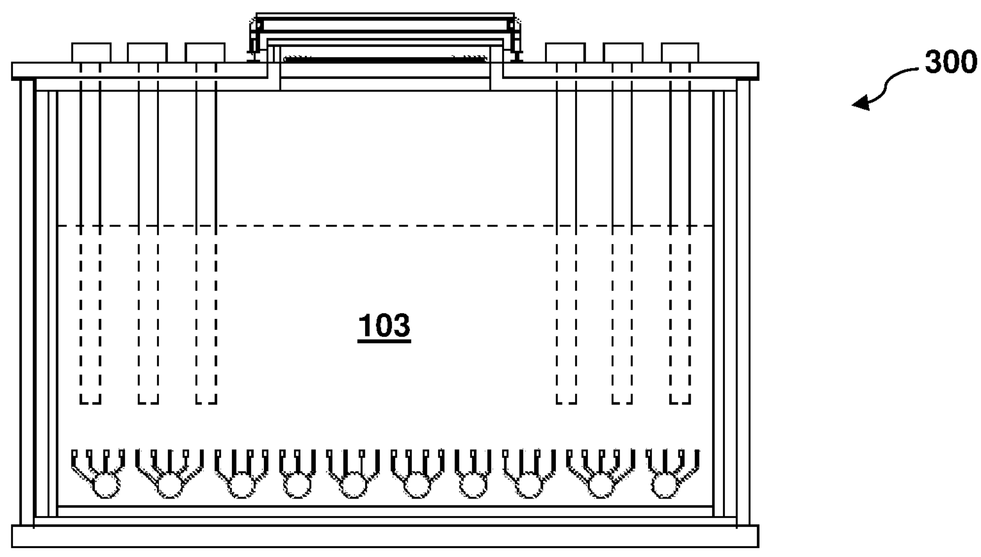
FIG. 4 shows a schematic representation, in longitudinal cross-section, of another embodiment of a device for the storage and transfer of thermal energy of solar origin according to the invention, wherein TPV cells are immersed in a fluidizable bed.
Figure 5:
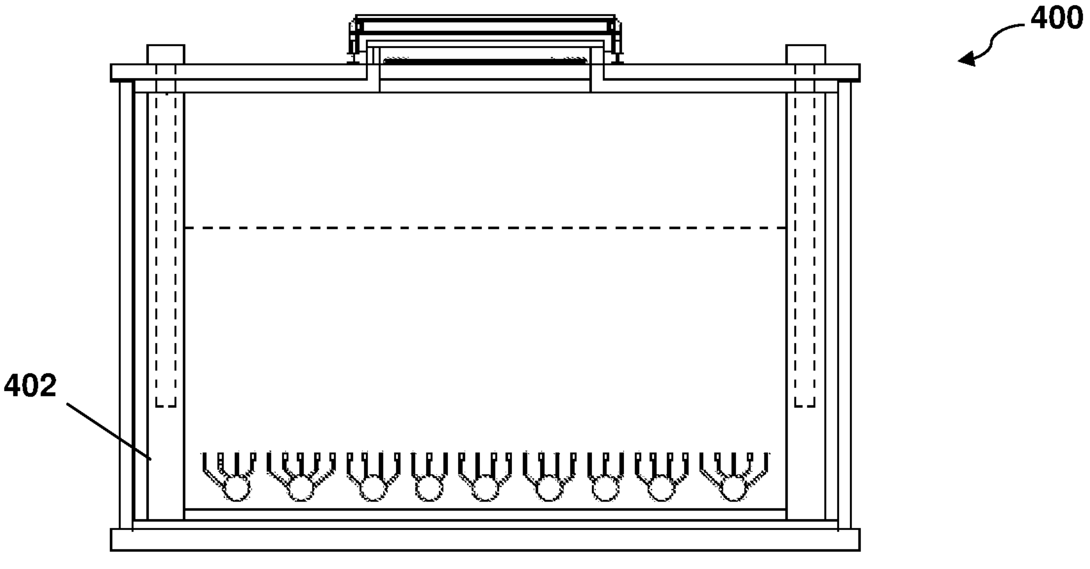
FIG. 5 shows a schematic representation, in longitudinal cross-section, of a further embodiment of a device for the storage and transfer of thermal energy of solar origin according to the invention, wherein TPV cells are arranged in a refractory lining of a casing housing a fluidizable bed.

FIGS. 3 to 5 refer to further preferred embodiments of the device of the invention, which differ from the first embodiment described above only for the position of the TPV cells. Accordingly, such additional embodiments will be described only in conjunction with such difference and the same numerals already introduced will generally be used to denote the same, corresponding or similar parts.

In the device of FIG. 3, globally denoted by 200, the TPV cells 104 of said plurality are associated with supports 140 analogous to the ones already introduced. In this case, supports 140 are arranged with a main development direction, in particular a transverse direction T, which, still according to the embodiment represented, is a substantially horizontal direction.

In the device of FIG. 4, globally denoted by 300, the TPV cells 104 of said plurality are immersed, at least in part, within said bed 103 of fluidizable solid particles.

In the device of FIG. 5, globally denoted by 400, the TPV cells 104 of said plurality are housed, at least in part, inside a refractory lining 402 of said casing 102, preferably at a lateral skirt thereof.

The device described above according to several embodiments and variants of the invention can be of a standalone type or be configured as part of an electric energy production plant, comprising one or more of such devices. In a preferred embodiment, the plant has a so-called "beam down" configuration, wherein said devices are irradiated from above by solar radiation.

The plant may include solar radiation capitation means, in particular one or more heliostats and/or one or more reflectors.

Production of electric energy from the solar radiation by means of said device and/or plant provides exposing bed 103 of fluidizable solid particles, directly or indirectly, to the solar radiation so as to store thermal energy. The energy production method provides usage of said plurality of thermophotovoltaic cells 104, arranged immersed in said bed 103 or in the proximity thereof. As said above, the overall arrangement is such that thermal energy is transferred from the solar radiation to the fluidizable solid particles of said bed 103 and from said fluidizable solid particles to said thermophotovoltaic cells 104, the latter transforming thermal energy of said fluidizable solid particles into electric energy.

In said method, a step of storing thermal energy received from the solar radiation by said bed 103 and a step of transferring the thermal energy stored in said storing step to said thermophotovoltaic cells 104 can be activated one independently from the other. In particular, the storage step can be activated in daytime, and the transfer step in the daytime and/or nighttime.

The present invention has been hereto described with reference to preferred embodiments thereof. It is understood that other embodiments might exist, all falling within the concept of the same invention, as defined by the protective scope of the claims hereinafter.

The invention claimed is:

1. A device for storage and transfer of thermal energy associated with an incident solar radiation, which device comprises:

a containment casing having a top and a bottom;

a bed of fluidizable solid particles received inside said containment casing;

a plurality of thermophotovoltaic cells arranged at or inside said containment casing and configured to transform thermal energy of said fluidizable solid particles into electric energy without steam, wherein thermal energy is transferred from the solar radiation to the fluidizable solid particles of said bed and from said fluidizable solid particles to said thermophotovoltaic cells, wherein the thermophotovoltaic cells are exposed to the fluidizable solid particles as thermal emitters at a temperature ≥600° C.;

wherein said device further comprises fluidization means configured for inputting a fluidization gas into said bed of fluidizable solid particles thereby fluidizing said solid particles, said fluidization means being disposed proximal to said bottom of said containment casing and further configured to input said fluidization gas upwards into said bed of fluidizable solid particles and towards said top;

wherein said bed of fluidizable solid particles, once fluidized, is configured to be selectively moved by said fluidization gas for storing thermal energy received from the solar radiation;

wherein said device is configured to selectively vary a fluidization gas speed or flow rate of the fluidization gas; and wherein each of said solid particles is formed from an oxidation-inert material having a spherical shape.

2. A device for storage and transfer of thermal energy associated with an incident solar radiation, which device comprises:

a containment casing having a top and a bottom;

a bed of fluidizable solid particles received inside said containment casing;

a plurality of thermophotovoltaic cells arranged at or inside said containment casing and configured to transform thermal energy of said fluidizable solid particles into electric energy without steam, wherein thermal energy is transferred from the solar radiation to the fluidizable solid particles of said bed and from said fluidizable solid particles to said thermophotovoltaic cells, wherein the thermophotovoltaic cells are exposed to the fluidizable solid particles as thermal emitters at a temperature ≥600° C.;

wherein said device further comprises fluidization means configured for inputting a fluidization gas into said bed of fluidizable solid particles thereby fluidizing said solid particles, said fluidization means being disposed proximal to said bottom of said containment casing and further configured to input said fluidization gas upwards into said bed of fluidizable solid particles and towards said top;

wherein said bed of fluidizable solid particles, once fluidized, is configured to be selectively moved by said fluidization gas for storing thermal energy received from the solar radiation; and wherein said device is configured to selectively vary a fluidization gas speed or flow rate of the fluidization gas.

3. The device according to claim 2, wherein the thermophotovoltaic cells of said plurality are housed, at least in part, at a freeboard ceiling of said containment casing.

4. The device according to claim 2, wherein the thermophotovoltaic cells of said plurality are housed, at least in part, inside a refractory lining of said casing.

5. The device according to claim 2, wherein the thermophotovoltaic cells of said plurality are immersed, at least in part, within said bed of fluidizable solid particles.

6. The device according to claim 2, wherein the thermophotovoltaic cells of said plurality are arranged in groups, each group sharing a common support, and wherein each support extends according to a main development direction, the main development direction being a substantially vertical or substantially horizontal direction.

7. The device according to claim 2, comprising additional heat exchanging means having one or more pipe bundles, crossed, in use, by a working fluid, and arranged within said containment casing so as to be immersed in, or lapped by, said bed of fluidizable solid particles.

8. The device according to claim 2, wherein the thermophotovoltaic cells are exposed at a temperature of 700-1000° C.

9. The device according to claim 2, wherein the containment casing omits heat exchangers and steam pipe circuitry associated with the heat exchangers.

10. The device according to claim 2, wherein said containment casing has an irradiation opening configured to allow entry of the solar radiation, which irradiation opening puts in direct communication an internal compartment of said containment casing with the external environment being devoid, in use, of closure or screen means, said irradiation opening being arranged so that said bed of fluidizable solid particles, or a part thereof, is directly exposed, in use, to the solar radiation that enters through said irradiation opening.

11. The device according to claim 10, wherein said thermophotovoltaic cells, or a part thereof, are directly exposed to the solar radiation.

12. An electric energy production plant, comprising one or more devices according to claim 2 and solar radiation capitation means which defines, jointly to said device(s), an irradiation configuration which makes solar radiation converge from above.

13. The electric energy production plant according to claim 12, which includes a beam down configuration wherein said one or more devices are irradiated from above by solar radiation.

14. The electric energy production plant according to claim 12, which is configured to provide electric energy directly obtained from the thermophotovoltaic cells of said plurality and from additional photovoltaic cells directly exposed to solar radiation.

* * * * *